2,698,827

PROCESS OF PRODUCING YEAST FROM PENTOSE CONTAINING COMPOUNDS

Konrad Bernhauer, Lorsch (Hessen), Germany, assignor to Aschaffenburger Zellstoffwerke A. G., Redenfelden (Oberbayern), a corporation of Germany No Drawing. Application September 8, 1950,
Serial No. 183,900

6 Claims. (Cl. 195—79)

My invention relates to a process of producing yeast from substrates containing pentose, for example sulfite waste liquor from beechwood or still residues containing the non-fermentable sugars remaining after alcoholic fermentation of sulfite waste liquor from sprucewood or of wood sugar stillage remaining after alcoholic fermentation of wood hydrolyzates.

Hitherto it has been assumed that only the "Wuchshefen" such as kinds of Torula and Candida have the ability to assimilate pentoses and to grow in substrates containing pentoses. Therefore only the "Wuchshefen" are used for producing yeast from the media containing pentoses mentioned above. Scientific literature mentions only "Wuchshefen" in connection with the production of yeast from pentoses, see for example the following publications: "Zeitschrift für angewandte Chemie," 58, 34 (1945), 59, 16 (1947), "Brauwelt" 3, 203, (1948). But is has not been known up to now that *Saccharomyces cerevisiae* are qualified for the production of yeast from pentoses. The assimilation of pentoses by a great number of microorganisms has been examined in very detailed studies, but those examinations proved that *Saccharomyces cerevisiae* show no ability or only a very small one of assimilation of d-xylose (see "Vorratspflege und Lebensmittelforschung," 2, 220 (1940) and "Brauwissenschaft," 1949, 10). Lately moreover it has generally been considered that the production of Saccharomyces is not possible in pentose containing media. S. Windisch says in the periodical "Brauwelt," 3, 203 (1948): "Die Mehrzahl der echten Hefen kann dagegen Pentosen nicht assimilieren. Die Kulturhefen aus dem Formenkreis von *Saccharomyces cerevisiae* sind auch nicht dazu imstande."

I have now overcome that preconceived opinion of the experts by my invention and I have recognized that contrary to the existing conception also culture yeasts (*Saccharomyces cerevisiae*) are able to assimilate pentoses in approximately the same manner and the same measure as the "Wuchshefen." I have found that for securing that effect only an adaptation to the pentoses is necessary occurring quickly and without difficulties. My experiments have shown that it is preferable to start with a relatively great quantity of yeast and to work under strong aeration and in the presence of abundant quantities of nutrient salts, that is under favorable conditions of growth.

For the adaptation I employ a solution of nutrient salts containing all nutrients as nitrogen compounds, phosphates and other nutrient salts in an abundant quantity as well as the compound to which the microorganism referred to has to be adapted. For the adaptation I use one of the usual apparatuses for cultivation warranting an optimum of air supply in the case of aerob microorganisms. In such an apparatus air in fine bubbles is inserting the nutrient medium respectively breaking it up into foam. Thus a very rapid adaptation is attained.

This principle of the adaptation of microorganism accommodates to the modern ideas of microbiological genetic by providing the premise that cells or mutants are present capable to assimilate the substance offered thanks to the large amount of starting microorganism mass. It must be considered that if using technical substrates such as sulfite waste liquor from beech and microorganisms being vitaminless such as Saccharomyces, not only a selection must take place of those cells able to assimilate the substrate offered (such as pentoses) but also at the same time of such cells being satisfied with the low amount of vitamins present in some substrates, whereby only a minimum amount of cells is developed from the whole population in use. Therefore that population must be relatively large. In order to facilitate the multiplication of these cells an optimum of growth conditions is attained in working in the presence of copious amounts of nutrient salts and under permanent strong aeration.

For realization of my process I take baker's yeast using sulfite waste liquor from beech or still residues from alcoholic fermentation of spruce sulfite waste liquors or wood sugar stillage as substrates and adapt the yeast to the assimilation of the pentoses present in those media. In following the reducing power against Fehling's solution in such a medium containing all necessary nutrient salts in excess—whilst the growth of yeast is proceeding under strong aeration—it is easy, on samples taken from that medium, to have an idea of the assimilation of the sugars. Thereby a course characteristic for the proceeding of the adaptation is becoming evident. First the reducing power is rapidly decreasing but only in an inconsiderable degree corresponding only to the amount of the easily assimilable hexoses present. Thereafter the reducing power is remaining approximately constant for about 8–10 hours—according to the kind of yeast used—and then it is rapidly decreasing. The increase of yeast is occurring parallel to the assimilation of sugar.

The initial period during which the reducing power of the medium decreases rapidly corresponds to a consumption of the hexose content as the yeast is propagated thereon. When the hexose is completely consumed, the reducing power of the medium remains constant, corresponding to the latent period of adaptation to the pentose, since the pentoses are reducing sugars though not ordinarily assimilable by the yeast. Following the period of adaptation, during which the yeast becomes adapted to utilize pentoses as its source of carbohydrates, the yeast begins to propagate on said pentoses which accounts for the second period during which the reducing power of the medium decreases.

In a one step process the further propagation of yeast may immediately be joined with the adaptation process described above, working in a continuous process in the manner hitherto known only for the "Wuchshefen."

The process described above for the adaptation of microorganisms to certain substrates may generally be employed for adaptation purposes. This method has a large number of advantages compared with the adaptation method known up to now which for adaptation require numerous repeated transfers of inoculum and take much time.

A further development of my invention relates to a two-stage process by producing first an adapted yeast and using that yeast for further propagation. By using such an adapted yeast the adaptation period is left out and the reducing power decreases continuously, but the growth of the yeast is increasing in the same degree. Thereby in a few hours the pentoses present are consumed; that occurs approximately with the same speed as for example by use of *Tor. utilis*.

By microscopic control and by the usual microbiological tests (by plating e. g.) it can be found out that in fact *Saccharomyces cerevisiae* is developed. In the same way it is quite clear that from an infection, as for example a "Wuchshefen" which can only be present in a few cells, under no circumstances a considerable amount of yeast can be produced within but a few hours. The results obtained at the cultivation of Saccharomyces in pentose containing medium correspond completely to the quantities obtainable with *Tor. utilis* in the same substrate. With the two organisms it takes also a correspondingly longer time of cultivation than it is necessary for the production of yeast from hexose containing substrates, the velocity of growth in solutions of xylose being essentially lower than in glucose solution.

My further experiments have shown that the cultivation of Saccharomyces in media containing pentose can be accomplished continously too without diminishing the result, exactly in the same way as the propagation of the "Wuchshefen." The percentage of nitrogen in the Saccharomyces grown in a medium containing pentose and also the proportion of raw protein corresponds to the usual values. Analyses showed 46–52% raw protein. In view of the prejudice of the specialists in spite of the intensive work of numerous experts concerning the production of yeast from pentose, my investigation that Saccharomyces is adaptable for that purpose is quite new and patentable. Besides the results of the examination show essential advantages and progresses compared to the production of yeast from pentose by "Wuchshefen."

Furthermore the cultivation of Saccharomyces has hitherto been dependent on substrates containing hexoses. Now it is possible to start also from media containing pentoses and thus the raw material basis for the production of Saccharomyces is considerably extended. To this it must be added that the hexoses in themselves already have a much larger extent of utilisation than the pentoses.

Substrates with a high amount of pentose applicable also to the production of Saccharomyces are: sulfite waste liquors from wood bearing leaves with a reducing substance composed of 80–90% pentose and 10–20% hexose, wood sugar stillage and still residues after alcoholic fermentation of sulfite waste liquors from spruce, both containing practically only pentoses as reducing substances and finally hydrolyzates of different natural products such as straw, corn cobs and the like, containing a very large amount of pentoses (or pentosanes respectively). In addition to this the use of Saccharomyces for the production of yeast from pentoses has an essential advantage over the Wuchshefen hitherto used. The Wuchshefen of the type *Tor. utilis* have very small cells. Therefore it is much more difficult to separate those than for example Saccharomyces with twice as large cells. Endeavours have been made to cultivate strains of *Tor. utilis* under the influence of camphor, having larger cells. Thereby *Tor. utilis* var. *major* were obtained with cells about twice as large as those of the starting form. My invention that pentoses can be assimilated by Saccharomyces render those measures unnecessary as the Saccharomyces have essentially larger cells from the beginning than *Tor. utilis* and therefore they can much more easily be separated from the medium than those.

*Examples*

1. To 100 parts waste sulfite liquor from beech prepared in the usual manner for the production of yeast and diluted with water adjusted to a sugar content of 0.8–1% and supplied with the necessary nutrient salts 0.5 part of common pressed yeast is added. Then the propagation of yeast is started under lively aerating. The growth of yeast occurring at once is stopped after the consumption of the small amounts of hexose in the medium. After a latent period of several hours during that the adaptation of the yeast to the pentoses takes place, the assimilation of the pentoses begins with a simultaneous and rapid increase of the cells. After the reducing power having disappeared yeast is obtained by centrifugating and washing out. In relation to the pentoses consumed 38–42% dry yeast is yielded.

2. 0.5 part of Saccharomyces adapted to pentoses is propagated in 100 parts of still residues after alcoholic fermentation of sulfite waste liquor from sprucewood containing 0.6–0.8% pentoses and the usual nutrient salts under good aeration. An apparatus is used herewith equipped for continuous propagation. As soon as the sugar content has been diminished to 0.2–0.3% continuously more sulfite waste stillage containing nutrient salts is added whereby at the same time the fermented solution containing yeast is flowing down in the same degree. The yeast is obtained from the solution in the usual manner by centrifugating and washing. The yield of dry yeast with reference to the consumed pentose is 40–45%.

Having described my invention I claim:

1. The process for the adaptation of the yeast *Saccharomyces cerevisiae* in a pentose medium, comprising adding nutrient salts to a medium containing pentoses substantially free of hexoses and inoculated with said yeast, and vigorously aerating said medium containing said yeast and salts for several hours, whereby said yeast becomes adapted to utilize said pentose as its source of carbohydrates.

2. The process for the propagation of the yeast *Saccharomyces cerevisiae* in a pentose medium, comprising adding nutrient salts to a medium containing pentoses substantially free of hexoses and inoculated with said yeast, vigorously aerating said medium containing said yeast and salts for several hours, whereby said yeast becomes adapted to utilize said pentose as its source of carbohydrates, and thereafter adding additional pentose to said adapted yeast while maintaining said vigorous aeration to propagate said yeast.

3. The process according to claim 2, wherein said additional pentose medium comprises a pentose-containing wood hydrolyzate.

4. The process for the propagation of the yeast *Saccharomyces cerevisiae* in a pentose medium, comprising adding nutrient salts to a medium containing pentoses substantially free of hexoses and innoculated with said yeast, vigorously aerating said medium containing said yeast and salts for several hours, whereby said yeast becomes adapted to utilize said pentose as its source of carbohydrates, adding sulfite waste liquor from beech wood in amount sufficient to bring the pentose content to about .8 to 1%, and propagating said yeast under vigorous aeration.

5. The process for the propagation of the yeast *Saccharomyces cerevisiae* comprising adding nutrient salts to a medium containing pentoses and hexoses, selectively removing said hexoses by said yeast to leave said pentoses substantially free of hexoses, and vigorously aerating said medium containing said yeast, said salts and said pentoses substantially free of hexoses for several hours, whereby after a latent period of adaptation to said pentoses said yeast is propagated thereon.

6. The process which comprises subjecting an aqueous solution containing both hexoses and pentoses to alcoholic fermentation for conversion of the hexoses, removing the alcohol to leave an aqueous solution containing a residue of pentoses and substantially free of hexoses, adding *Saccharomyces cerevisiae* and nutrient salts therefor to the aqueous solution of pentoses, aerating to permit yeast propagation until the reducing power is diminished and reaches a substantially constant value, continuing aeration until the reducing power after a latent period again begins to diminish, withdrawing part of the solution, separating yeast from said withdrawn part of the solution, and introducing additional aqueous solution of pentose.

References Cited in the file of this patent

UNITED STATES PATENTS

| Number | Name | Date |
|---|---|---|
| 1,269,287 | Lackman | June 11, 1918 |
| 1,273,392 | McKee | July 23, 1918 |
| 1,284,739 | McKee | Nov. 18, 1918 |
| 1,703,272 | Heijkenskjold | Feb. 26, 1929 |
| 1,775,568 | Heijkenskjold | May 6, 1930 |
| 2,401,819 | Eweson | June 11, 1946 |

OTHER REFERENCES

Peterson et al.: Ind. and Eng. Chem., January 1945, pages 30–35.

Kurth: Ind. and Eng. Chem., February 1946, pages 204–207.

Johnson: Chemical Abstracts, 1949, page 815, citing J. Am. Chem. Soc. 70, 2961-3 (1948).